United States Patent [19]

Schneider et al.

[11] 4,407,631

[45] Oct. 4, 1983

[54] MOTOR-PUMP AGGREGATE

[75] Inventors: Wolfangang Schneider, Weisenheim; Josef Peters, Lambsheim; Karl Gaffal, Hessheim, all of Fed. Rep. of Germany

[73] Assignee: Klein, Schanzlin & Becker Aktiengesellschaft, Frankenthal, Fed. Rep. of Germany

[21] Appl. No.: 271,370

[22] Filed: Jun. 8, 1981

[30] Foreign Application Priority Data

Jun. 6, 1980 [DE] Fed. Rep. of Germany ....... 3021318

[51] Int. Cl.³ .............................................. F01D 5/34
[52] U.S. Cl. .......................... 415/122 R; 416/244 R; 403/259; 366/265
[58] Field of Search ............... 366/263, 265, 264, 331, 366/279; 415/122 R, 501; 416/244 R; 403/259, 260, 261, 356; 417/424, 365; 308/36, 139, 140; 277/190, 191, 236, 169, 170

[56] References Cited

U.S. PATENT DOCUMENTS

| | | | |
|---|---|---|---|
| 1,400,032 | 12/1921 | Dickey | 416/244 R X |
| 1,531,462 | 3/1925 | Verola | 415/501 |
| 1,717,969 | 6/1929 | Goodner | 415/175 |
| 1,821,772 | 9/1931 | Ruthman | 415/175 |
| 1,840,752 | 12/1932 | Thomas | 308/139 |
| 2,053,666 | 9/1936 | Hirth et al. | 416/244 R X |
| 2,202,863 | 6/1940 | Plön | 403/259 |
| 2,555,899 | 6/1951 | Pernthaler | 366/263 |
| 2,602,683 | 7/1952 | Aue | 403/259 |
| 2,936,714 | 5/1960 | Balje | 184/6.11 |
| 3,160,106 | 12/1964 | Asworth | 415/175 X |
| 3,160,108 | 12/1964 | Sence | 416/244 R |
| 3,174,680 | 3/1965 | Young | 415/112 |
| 3,264,005 | 8/1966 | Bialkowski | 277/236 |
| 3,617,156 | 11/1971 | Schiele | 417/365 |
| 3,720,430 | 3/1973 | St. Paul | 403/337 |
| 3,819,289 | 6/1974 | Carroll | 403/259 |
| 4,340,317 | 7/1982 | Heitmann et al. | 403/25 |

FOREIGN PATENT DOCUMENTS

| | | | |
|---|---|---|---|
| 562536 | 9/1958 | Canada | 415/122 |
| 2913966 | 11/1979 | Fed. Rep. of Germany | 403/259 |
| 578533 | 7/1946 | United Kingdom | 416/244 R |

*Primary Examiner*—Philip R. Coe
*Assistant Examiner*—Frankie L. Stinson
*Attorney, Agent, or Firm*—Kontler, Grimes & Battersby

[57] ABSTRACT

A motor-pump aggregate whose pump is a glandless centrifugal pump and is intended for use in a nuclear reactor plant has hollow coaxial pump and motor shafts which are sealingly coupled to each other. To this end, the first end portion of the pump shaft extends into the adjacent first end portion of the motor shaft and has an external conical shoulder for engagement with an internal conical seat of the first end portion of the motor shaft. A feather holds the first end portions against rotation relative to one another, and the shoulder is urged against the seat by a pair of threaded connectors one of which is anchored in a disc-shaped member in the region of the second end portion of the motor shaft and the other of which is anchored in the first end portion of the pump shaft. The disc-shaped member and the second end portion of the motor shaft have mating ring gears to ensure accurate and a reproducible centering. The connection between the second end portion of the pump shaft and an impeller is similar to that between the second end portion of the motor shaft and the disc-shaped member except that one of the respective connectors is anchored in a transverse end wall which is inserted into the second end portion of and is welded to the pump shaft.

10 Claims, 1 Drawing Figure

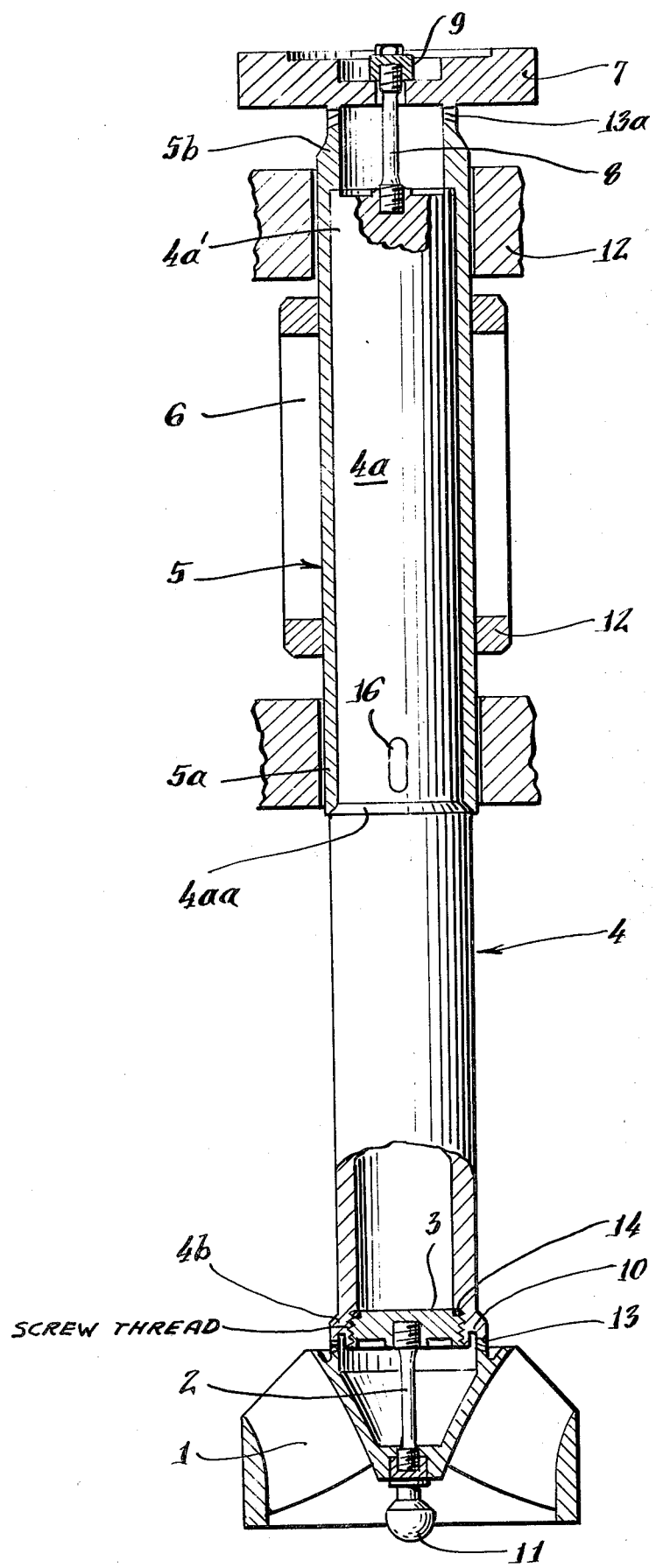

4,407,631

MOTOR-PUMP AGGREGATE

BACKGROUND OF THE INVENTION

The present invention relates to motor-pump aggregates or units in general, and more particularly in improvements in motor-pump aggregates of the type wherein the motor shaft is coaxial with the pump shaft and the pump is a centrifugal pump with one or more impellers. Such aggregates can be used in nuclear reactor plants and often employ glandless pumps.

It is well known that a pump which is used in a nuclear reactor plant or for analogous purposes must be designed with a view to minimize wear. This entails such mounting of its components that they are coaxial to one another, i.e., wear is avoided or reduced considerably if the play between neighboring parts which move relative to each other is minimal as well as if the parts of which the aggregate consists can be assembled of components adapted to be put together or separated and reassembled with a high degree of reproducibility, especially as far as the coaxiality of rotating parts is concerned. In many instances, the RPM of shafts in such aggregates is regulated by thyristorized controls which is an additional reason for the need to ensure that the parts which rotate with the pump shaft and/or motor shaft are mounted without any clearances and that they are absolutely or practically exactly coaxial with each other. Problems arise because certain parts, such as impellers, rotors, components of bearings and the like, must be inspected and/or replaced at frequent or less frequent intervals. This means that such rotary parts must be removed and reinstalled or replaced with fresh parts, and the renewed installation or replacement must be effected with a minimum or likelihood that the play or centering of a freshly inserted or reinserted part would be less satisfactory than the play or centering of the previously employed part. Moreover, the replacement must be effected with minimal losses in time, i.e., there is no time to balance the inserted parts, either individually or after assembly with other components of the aggregate.

As a rule, the shaft or shafts of such aggregates are hollow; this renders it more likely that the critical RPM will be higher than the RPM when the aggregate is in actual use.

Heretofore known motor-pump aggregates which are used in nuclear reactor plants or the like fail to meet the above outlined requirements. Thus, such conventional aggregates exhibit too much play between their separable parts, the wear upon the moving parts and the adjacent stationary parts is excessive due to pronounced play and/or due to inaccurate centering, centering is time-consuming and unreliable, and the down times are too long.

OBJECTS AND SUMMARY OF THE INVENTION

An object of the invention is to provide a novel and improved motor-pump aggregate, especially an aggregate employing a glandless centrifugal pump, which can be utilized in nuclear reactor plants or analogous establishments with pronounced reduction of down times and greatly reduced danger of contamination of the surrounding area.

Another object of the invention is to provide an aggregate of the above outlined character wherein the pump shaft and the motor shaft are assembled in a novel and improved way, wherein the connection between the pump shaft and the parts which rotate therewith is free or practically free of play, wherein the connection between the motor shaft and the parts which receive torque therefrom is free or practically free of play, and wherein the parts of the aggregate are properly centered even though there is no need for balancing of individual parts prior to insertion into the aggregate or subsequent to such insertion.

A further object of the invention is to provide an aggregate of the above outlined character with novel and improved means for coupling the pump and motor shafts to one another and with novel and improved means for separably connecting the shafts with bearings, impeller means and other components of motor-pump aggregates for use in nuclear reactor plants or the like.

An additional object of the invention is to provide a motor-pump aggregate wherein certain parts can be removed and reinstalled or replaced with fresh parts with minimal losses in time and without increasing the play between separable parts and/or departure from true centering of all rotary parts.

Another object of the invention is to provide a relatively simple and compact motor-pump aggregate of the above outlined character which can be used as a superior substitute for heretofore known aggregates.

An ancillary object of the invention is to provide the aggregate with novel and improved means for preventing penetration of contaminants into the interior of the hollow pump and/or motor shaft.

Another object of the invention is to provide a motor-pump aggregate which allows for reliable and predictable transmission of torque even if the motor shaft is driven at a speed which fluctuates within a wide range, e.g., when the speed oscillates or fluctuates under the action of a thyristorized driving unit.

A further object of the invention is to provide novel and improved means for connecting the shafts of the pump and motor in the above outlined aggregate with one or more bearings, especially with one or more components of a thrust bearing for the motor shaft.

The invention is embodied in a motor-pump aggregate, particularly in an aggregate including a glandless centrifugal pump for use in nuclear reactor plants. The aggregate comprises preferably hollow coaxial pump and motor shafts having adjacent first end portions one of which extends into the other and second end portions which are remote from one another, and means for coupling the first end portions of the two shafts to one another so that the motor shaft can transmit torque to the pump shaft. The coupling means comprises a conical seat in the other first end portion (e.g., in the first end portion of the motor shaft), a complementary conical external surface provided on the one first end portion and abutting against the seat, means (e.g., a feather or key) for non-rotatably connecting the first end portions to each other, and means for sealingly urging the external surface against the seat.

The aggregate further comprises impeller means which is adjacent to the second end portion of the pump shaft and means for coaxially securing the impeller means to the pump shaft. Such securing means preferably comprises mating ring gears provided on the second end portion of the pump shaft and on the impeller means. If the second end portion of the pump shaft is hollow, the latter preferably comprises a transverse end wall which is installed therein or secured thereto. The aggregate further comprises means for biasing the ring gears against one another, and such biasing means may comprise cooperating connectors provided on the end wall and on the impeller means. For example, the connectors may comprise an externally threaded member which is anchored in the end wall of the second end portion of the pump shaft and an internally threaded member which engages the impeller means and mates with the externally threaded member.

Means my be provided for bonding the end wall to the second end portion of the pump shaft, and such bonding means may comprise one or more welded seams. The bonding means prevents penetration of contaminants into the interior of the hollow shaft or shafts or escape or contaminants from the interior of the hollow shaft or shafts into the surrounding atmosphere.

The aggregate may further comprise thrust bearing means which is adjacent to the second end portion of the motor shaft and means for coaxially securing the bearing means to the motor shaft. The just mentioned securing means may comprise mating ring gears on the bearing means and on the second end portion of the motor shaft. The bearing means may comprise a disc-shaped bearing member (e.g., a race for spherical or otherwise configurated rolling elements of a thrust bearing) and one of the ring gears is then provided on such disc-shaped member. The aforementioned means for sealingly urging the conical external surface against the seat of the coupling means between the two shafts may comprise means for biasing the ring gears in the region of the second end portion of the motor shaft against each other; such biasing means may comprise cooperating connectors provided on the bearing means and on one of the shafts (e.g., on the pump shaft if the motor shaft is hollow and the first end portion of the pump shaft extends into the motor shaft and all the way to the bearing means).

The novel features which are considered as characteristic of the invention are set forth in particular in the appended claims. The improved aggregate itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary axial sectional view of a motor-pump aggregate which embodies one form of the present invention.

DESCRIPTION OF THE PREFERRED EMBODIMENTS

The drawing shows a portion of a motor-pump aggregate which comprises a composite shaft including a hollow motor shaft 5 and a hollow pump shaft 4. The motor shaft 5 has first and second end portions 5a, 5b which are rotatable in two schematically illustrated radial bearings 12 (e.g., friction bearings or antifriction ball or roller bearings of any known design). The median portion of the motor shaft 5 is connected with a rotor package 6 forming part of electric motor which drives the pump. The pump which includes the pump shaft 4 is a glandless centrifugal pump of the type normally or often used in nuclear reactor plants. The first end portion 4a of the pump shaft 4 extends into the first end portion 5a of the motor shaft 5 and its length almost matches that of the entire shaft 5.

The means for separably but sealingly coupling the end portions 4a and 5a to each other comprises a conical internal seat 15 in the end portion 5a, a conical external surface or shoulder 4aa on the end portion 4a, a feather 16 or an analogous device which holds the end portions 4a, 5a against rotation relative to one another, and means (including two connectors 8, 9) for biasing the shoulder 4aa against the seat 15 to thus prevent penetration of contaminants into the end portions 4a, 5a and/or escape of fluids from the interior of the composite shaft into the surrounding area. The connector 8 is an externally threaded member which is anchored in a boss or stub 4a' of the end portion 4a, and the other connector 9 is a nut which meshes with the member 8 and engages a disc-shaped member or race 7 forming part of a thrust bearing for the shaft 5. The remaining parts of the thrust bearing are not shown in the drawing; for example, the bearing can comprise a second disc-shaped member above the member 7 (as viewed in the drawing) and an annulus of rollers between the two disc-shaped members.

The member 7 is centered with reference to the motor shaft 5 by two ring gears 13a one of which is provided on the member 7 and the other of which is provided on the adjacent second end portion 5b of the motor shaft 5. The connectors 8, 9 urge the two gears 13a against each other to eliminate play. Depending on the degree of precision with which the teeth of the gears 13a are machined, the member 7 can be replaced with a fresh member by the simple expedient of separating the connector 9 from the connector 8 so that the illustrated member 7 can be removed and replaced with another disc-shaped member whose ring gear 13a is machined with the same degree of precision as the ring gear on the illustrated member 7.

The second end portion 4b of the pump shaft 4 has a transverse end wall 3 which is fitted thereinto and is bonded thereto by a ring-shaped welded seam 10. This prevents penetration of contaminants into the hollow shaft 4 and/or escape of contaminants from the shaft 4 into the surrounding area. The end portion 4b carries an impeller 1 which is non-rotatably secured to the end wall 3 by connectors 2, 11 corresponding substantially to the connectors 8, 9. The connector 2 is anchored in the end wall 3 and mates with the connector 11 which has a spherical handle or head and includes a nut engaging the impeller 11. The means for centering the impeller 1 with reference to the shaft 4 includes a pair of mating ring gears 13 one of which is provided on the end portion 4b and the other of which is provided on the impeller 1. These ring gears are biased against each other by the connectors 2 and 11.

If desired or necessary, the connector means between the end wall 3 and the impeller 1 may comprise fluid-operated means (e.g., a hydraulic cylinder and piston unit) for biasing the gear 13 of the impeller 1 against the gear 13 of the end portion 4b. For example, the connector 11 may comprise two portions with a fluid-filled chamber therebetween so that the impeller 1 is pulled against the end portion 4b. The welded seam 10 prevents penetration of primary water into the shaft 4 if the pump including the shaft 4 is used in a nuclear reactor plant. In addition to welding the end wall 3 to the end portion 4b of the shaft 4, the connection between these parts may further include external threads on the end wall 3 and internal threads in the adjacent part of the end portion 4b. If necessary or desirable, a temperature-resistant seal can be inserted between the end wall 3 and the end portion 4b, e.g., at the locus designated by the reference character 14.

The rotor package 6 may be a press fit on the shaft 5 so that the parts 5 and 6 constitute an integral unit. The clearance between the end portion 4a of the pump shaft 4 and the surrounding motor shaft 5 is preferably negligible to further enhance the centering action. Alternatively, the shaft 4 can be centered in the shaft 5 only in the region of the external shoulder 4aa or in the region of the boss 4a', i.e., close to the ring gears 13a. The bias of the shoulder 4aa against the internal seat 15 is preferably selected in such a way that expansion of the end portion 5a of the shaft 5 remains within elastic limits. If the end portion 4a is a close fit in the shaft 5, the boss 4a' can abut against the disc-shaped member 7 or against an internal shoulder of the shaft 5. The radial bearings 12 may include inner races which are a press fit on the adjacent portions of the shaft 5. The thrust bearing including the disc 7 can be designed in such a way that it takes up axial stresses acting upwardly, as viewed in the drawing, and/or in the opposite direction. The connectors 8, 9 may include hydraulic or pneumatic clamping devices which not only urge the shoulder 4aa against the seat 15 but, at the same time, eliminate play between the two ring gears 13a. It is often desirable to design the connectors 8, 9 in such a way that they can be used interchangeably with the connectors 2, 11; this contributes to a reduction of initial cost and reduces the number of parts which must be held in storage.

An important advantage of the improved aggregate is that the member 7 and/or impeller 1 can be readily separated from the respective shafts and that the shafts 4 and 5 can be readily separated and reassembled without risking an increase of play and/or absence of satisfactory centering. Also, the parts 7 and 1 can be replaced with fresh parts without reducing the accuracy of centering action, as long as the ring gears on the freshly installed parts are machined with the same degree of precision as the ring gears on the previously used parts. There is no need to balance the aggregate subsequent to reassembly and/or subsequent to installation of a fresh part because the self-centering means at the second ends of the shafts 4 and 5 render such operations unnecessary.

The improved aggregate exhibits many additional important and unobvious advantages. These include a self-centering connection between the impeller 1 and the pump shaft 4 owing to the provision of ring gears 13, a self-centering connection between the shafts 4 and 5 owing to the provision of shoulder 4aa and seat 15, and a self-centering connection between the shaft 5 and the disc-shaped member 7 owing to the provision of ring gears 13a. Furthermore, the parts 1 and 7 can be connected to and disconnected from the respective shafts with minimal losses in time (there is no need to provide telescoped connections between the parts 1, 4 and/or 5, 7, i.e., the impeller 1 is properly centered as soon as the ring gears 13 are brought into mesh and the connectors 2, 11 are properly attached to each other, and the disc-shaped member 7 is properly centered as soon as the gears 13a are brought into mesh and the connectors 8, 9 are properly attached to each other). The quality of centering action and/or the absence of play is not affected by replacement of the part 1 and/or 7 with an equivalent part as long as the machining of teeth on the gears 13, 13a of the fresh parts 1 and 7 is just as satisfactory as on the illustrated parts 1 and 7. The rotor means 6 can transmit torque directly to the disc-shaped member 7 by way of the motor shaft 5. The likelihood of corrosion owing to rubbing between the shafts 4 and 5 is nil or negligible; this is due to the provision of the conical seat 15 and shoulder 4aa as well as to accurate fitting of the end portion 4a into the shaft 5. The seat 15 and shoulder 4aa further reduce the likelihood of expansion of the shaft 4 relative to the shaft 5 or vice versa and this, too, contributes to a reduction of likelihood of rubbing between the parts 4, 5 (corrosion is a direct or immediate result of such rubbing). The extent of axial stressing of the shafts 4 and 5 in a direction to maintain the shoulder 4aa in permanent contact with the seat 15 can be readily selected in such a way that the likelihood of rubbing of shafts 4 and 5 against each other is eliminated. The surfaces of contact between the impeller 1 and member 7 on the one hand and the end portions 4b, 5b on the other hand need not be subjected to any special treatment (e.g., they need not be sprayed with special fluids) because the danger of rubbing contact between the teeth of the gears 13 and/or 13a is very remote or non-existent. Therefore, such parts can stand long periods of use without the aforementioned treatment which is often costly and time-consuming. If the spare parts are properly machined, they can be installed in the aggregate without balancing prior and/or subsequent to installation. This reduces the down times and the danger of malfunctioning of the plant in which the aggregate is put to use. The aforementioned optional fluid-operated tensioning means in the connector means including the parts 2, 11 and/or 8, 9 contributes to establish and maintain desired tensioning forces without resorting to an excessive number of threaded members. The interior of the composite shaft can be properly sealed from the surrounding area even though the parts 1, 7 need not have cylindrical surfaces fitting into the end portions 4b, 5b or vice versa.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. In a motor-pump aggregate, particularly in an aggregate including a glandless centrifugal pump for use in nuclear reactor plants, the combination of coaxial pump and motor shafts having adjacent first end portions and second end portions remote from one another, one of said first end portions extending into the other of said first end portions; means for coupling said first end portions to one another so that said motor shaft can transmit torque to said pump shaft, including a conical seat in said other first end portion, a complementary conical external surface provided on said one first end portion and abutting against said seat, means for non-rotatably connecting said first end portions to one another, and means for sealingly urging said surface against said seat; impeller means adjacent to the second end portion of said pump shaft; and means for coaxially securing said impeller means to said pump shaft, including mating ring gears respectively provided on the second end portion of said pump shaft and on said impeller means.

2. The combination of claim 1, wherein at least one of said shafts is hollow.

3. The combination of claim 1, wherein said second end portion of said pump shaft is hollow and further comprising an end wall provided in said second end portion of said pump shaft as well as means for biasing said ring gears against one another, said biasing means comprising cooperating connectors provided on said end wall and on said impeller means.

4. The combination of claim 3, wherein said connectors include an externally threaded member anchored in said end wall and an internally threaded member engaging said impeller means and mating with said externally threaded member.

5. The combination of claim 3, further comprising means for bonding said end wall to said second end portion of said pump shaft so that the interior of said last mentioned second end portion is sealed from the surrounding area.

6. The combination of claim 5, wherein said bonding means comprises a welded seam.

7. The combination of claim 1, further comprising a disc-shaped member adjacent to the second end portion of said motor shaft and means for coaxially securing said disc-shaped member to the second end portion of said motor shaft, including mating second ring gears respectively provided on the second end portion of said motor shaft and on said disc-shaped member.

8. The combination of claim 7, wherein one of said second ring gears is provided on said disc-shaped member.

9. The combination of claim 8, wherein said means for sealingly urging comprises means for biasing said second ring gears against one another, said biasing means including cooperating connectors provided on said disc-shaped member and one of said shafts.

10. The combination of claim 9, wherein said motor shaft is hollow and said first end portion of said pump shaft extends into said motor shaft and carries one of said connectors.

* * * * *